(No Model.)
M. H. WELDS.
JACK.
No. 582,246.   Patented May 11, 1897.
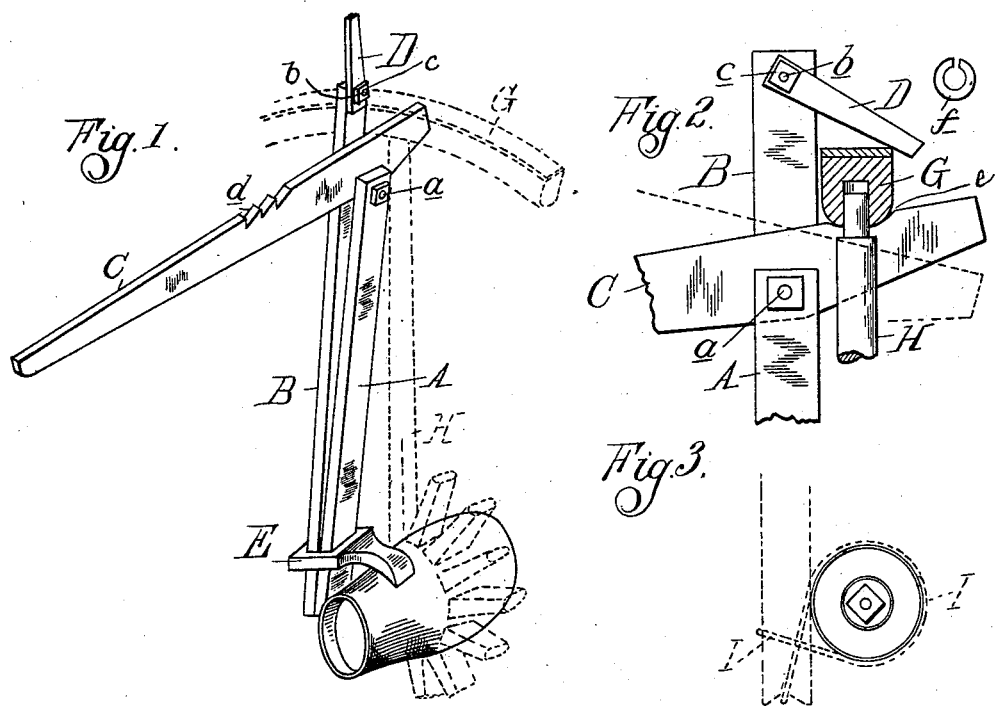
Witnesses:
Otto H. Barthel
P. M. Hulbert
Inventor:
Martin H. Welds
By Thos. S. Sprague & Son
Attorneys.

UNITED STATES PATENT OFFICE.

MARTIN H. WELDS, OF DETROIT, MICHIGAN.

JACK.

SPECIFICATION forming part of Letters Patent No. 582,246, dated May 11, 1897.

Application filed January 18, 1897. Serial No. 619,620. (No model.)

*To all whom it may concern:*

Be it known that I, MARTIN H. WELDS, a citizen of the United States, residing at Detroit, in the county of Wayne and State of Michigan, have invented certain new and useful Improvements in Jacks, of which the following is a specification, reference being had therein to the accompanying drawings.

This invention refers more particularly to what is commonly termed a "wagon-jack;" and the invention consists in the construction and arrangement of the parts whereby the jack is adapted not only for the usual work of jacking up the wheels of the wagon, but also for setting up the fellies to the tire, if the tire should become loose, all as more fully hereinafter described, and shown in the drawings, in which—

Figure 1 shows the jack as in use for setting up the fellies of a wheel the tire of which has become loose; and Fig. 2 is a cross-section through the felly of the wheel in the vertical plane of the lever, showing the portions of the jack in elevation. Fig. 3 is a diagram showing the use of a modified form of stirrup.

A and B are the legs of the jack. C is the lever, and D is the dog. The legs A and B are two sticks of wood of unequal length, and the lever C is pivoted between them at *a* in such manner that the shorter leg, which in the drawings is the leg A, does not extend above the lever C, while the leg B extends with its upper end some distance above and has the dog D pivotally secured to it at *b*.

The fulcrum *a* is formed, preferably, by a pin or bolt which passes through the legs and the lever and holds the parts just loose enough together to allow the legs to swing freely on the bolt, and the leg A preferably extends up only far enough to receive the bolt, so that the leg A terminates below the upper face of the lever C.

The dog D is held by a bolt *b* on the leg B and turns loosely on said bolt. By tightening the nut *c* of said bolt the dog may, however, be held in an upturned position out of use, as in Fig. 1.

The lever C is preferably formed of a stick of wood provided with suitable notches *d* for the dog to engage in, and another notch or depression *e* is preferably formed at the short end of the lever near the fulcrum.

In practice in using the jack for jacking up the wheel the operator grasps the lever with one hand, holding the dog with it at the same time, as shown in dotted line. Holding it thus he thrusts it under the wagon and by a continuous and slight upward and forward movement he readily adjusts the jack in position. By depressing the lever the operator then lifts the axle to raise the wheel from the ground, and the engagement of the dog into one of the notches holds the lever in position.

The principal advantage of my jack lies in its adaptability for jacking up the fellies of wheels on which the tires have become loose. This is a frequent and annoying occurrence in dry weather, and the ordinary remedy is to resort to a blacksmith's shop and perform the operation known as "setting up" the tire. With my jack this becomes unnecessary by using it in the following manner: I fold the two legs together and slip upon them a stirrup E, as shown in Fig. 1. This stirrup has a square opening, so that it will slip up or down on the legs, and it has a laterally-projecting bearing to rest on the hub and which when the jack is thus supported causes the stirrup to bend and hold fast upon the legs in any desired position. If the lever is then thrust under the top felly G until its notch *e* engages with the felly and then depressed, as shown in Fig. 2, it will lift the felly G off the spoke H and permit the ready insertion of a split-leather washer *f* on top of the shoulder of the spoke, thereby holding the felly in contact with the tire. This operation may be repeated at several equidistant spokes of the wheel and the wheel be thereby tightened in a simple and satisfactory manner without loss of time, and if wet weather should set in the washers may be taken out again and thus prevent the wheel from being dished, which would result from tightening the tire.

The stirrup E facilitates the use of the jack for tightening the fellies. However, it is a small matter to make an equally serviceable stirrup by means of a leather strap or a piece of rope I wound around the hub, as shown in Fig. 4, an arrangement which is self-explanatory.

It will be seen that by reason of the short length of the leg A, which is preferably the right-hand leg, the lever C is entirely exposed upon one side, which thereby admits a free view and access to the work of inserting a washer on the spokes, while the other leg holds the jack up to the work and holds the dog, which is made rather long, out of the way of the work.

My construction of jack is very simple and cheap, as it can be built of few pieces of hard wood, which hardly require any shaping, and it requires but two bolts, and yet it is of more extended and valuable use to a farmer than the ordinary wagon-jack, and as it is very light and folds up completely, the distance between $a$ and $b$ being greater than that between $a$ and the end of the lever, it may be conveniently folded and stored away on the vehicle as a permanent adjunct thereto, if desired.

What I claim as my invention is—

1. The combination in a jack, of a lever provided with a pin or bolt extending through it and forming its fulcrum, two supporting-legs pivotally secured upon opposite sides of the lever by said pin or bolt, and a stirrup adapted to detachably engage upon the legs and provided with a laterally-projecting bearing adapted to support the jack in position upon the hub of a wheel.

2. The combination in a jack of a lever provided with a pin or bolt extending through it and forming its fulcrum, supporting-legs pivotally secured upon opposite sides of the lever by said pin or bolt and a bearing for the hub, of a wheel adapted to be detachably secured to the lower end of the leg, substantially as described.

In testimony whereof I affix my signature in presence of two witnesses.

MARTIN H. WELDS.

Witnesses:
M. B. O'DOGHERTY,
OTTO F. BARTHEL.